Figure 1:
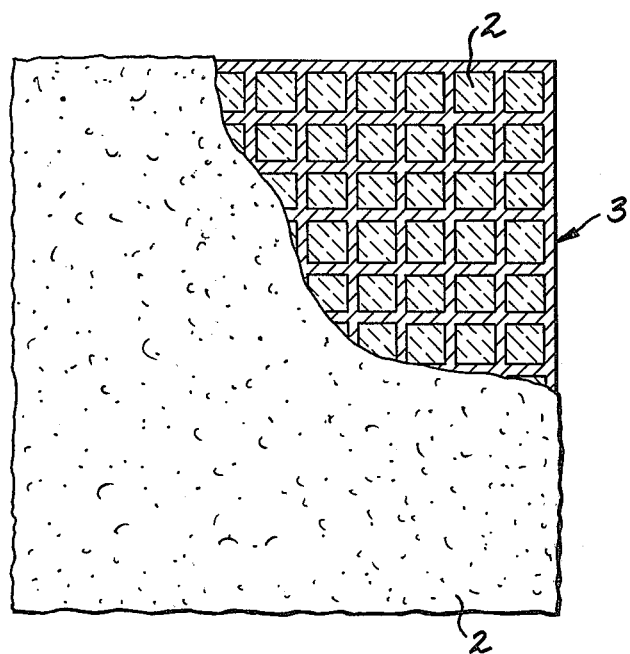

United States Patent [19]

Will

[11] 4,324,848

[45] Apr. 13, 1982

[54] POSITIVE ELECTRODE FOR LEAD ACID BATTERY

[75] Inventor: Fritz G. Will, Scotia, N.Y.

[73] Assignee: General Electric Company, Schenectady, N.Y.

[21] Appl. No.: 228,647

[22] Filed: Jan. 26, 1981

[51] Int. Cl.³ .............................................. H01M 4/56
[52] U.S. Cl. .................................... 429/228; 429/245
[58] Field of Search ............... 429/228, 245, 241, 225; 427/123, 126.1, 126.3

[56] References Cited

U.S. PATENT DOCUMENTS 3,870,563  3/1975  Ruben .................................. 429/228
4,037,031  7/1977  Jacob .............................. 429/228 X Primary Examiner—Charles R. LeFevour Attorney, Agent, or Firm—Jane M. Binkowski; James C. Davis, Jr.; Joseph T. Cohen

[57] ABSTRACT

A positive electrode for use in a lead-sulfuric acid electrolyte battery comprised of a grid supporting a layer of $PbO_2$, said grid being comprised of an electrically conducting substrate having an adherent protective at least substantially pinhole-free shield of electrically conducting material, said shield being composed of a coating of semiconducting metal oxide, or a composite of at least a substantially pinhole-free external coating of semiconducting metal oxide and at least a substantially pinhole-free coating of metal intermediate to the substrate and semiconducting oxide coating, said sulfuric acid electrolyte having a substantially deleterious effect on said substrate but having no significant deleterious effect on the shield.

10 Claims, 5 Drawing Figures

POSITIVE ELECTRODE FOR LEAD ACID BATTERY

The present invention relates to a novel positive electrode for use in a secondary lead-sulfuric acid electrolyte storage cell or battery.

Today's Pb-sulfuric acid batteries use Pb or Pb-rich alloy grids as a conducting support for the active masses in both the positive and negative plate or electrode. Two major problems attend the use of Pb grids: their large weight and their corrosion. These two features contribute to the known low specific energy and comparatively limited cycle life of Pb-acid batteries.

In a typical vehicle battery, the positive and the negative grid together constitute nearly 25% of the total battery weight. Two factors account for the large weight of the grids: the high resistivity of Pb (12 times that of Cu) necessitating the use of thicker grids, and to a lesser extent its high density (1.25 times that of Cu).

Furthermore, the Pb grid in the positive plate is thermodynamically unstable and corrodes by alternately forming on its surface a layer of $PbO_2$ during charging and of $PbSO_4$ during discharging. These layers are porous, have poor conduction and adherence and lead to a progressive deterioration of the Pb grid during cycling both in terms of the conductivity of the grid and the mechanical integrity of the whole plate.

Many attempts have been made to overcome these problems by replacing the Pb in the grid with other materials, but no successful solution has been identified as yet. Metals and alloys such as Ni, Nb, Ti, Ti-Mo-Zr alloy and Ti with a nitride layer have been explored as base materials for the positive grid. However, all of these either corrode or form passivating oxide films and have to be protected with a layer of Au. It has been found that even Au forms a passivating film which leads to a gradual performance degradation with cycling. Furthermore, the expense and rarity of Au render this approach unattractive.

This invention is directed to a positive electrode or plate having a Pb-free grid. The present grid with an electrical resistance equivalent to that of a conventional Pb alloy grid weighs significantly less than such conventional grid. Also, since the present grid is substantially corrosion free, it results in substantially longer battery life than attainable with the Pb alloy grid.

Briefly stated, the present positive electrode for use in a lead-sulfuric acid electrolyte cell or battery is comprised of a grid supporting an adherent layer of $PbO_2$, said grid being comprised of an electrically conducting substrate having an adherent protective at least substantially pinhole-free shield of electrically conducting material, said shield being composed of a coating of semiconducting metal oxide, or a composite of at least a substantially pinhole-free external coating of semiconducting metal oxide and at least substantially pinhole-free coating of metal intermediate between the substrate and semiconducting oxide coating, said sulfuric acid electrolyte having a substantially deleterious effect on said substrate, but having no significant deleterious effect on the shield.

Figure 2:
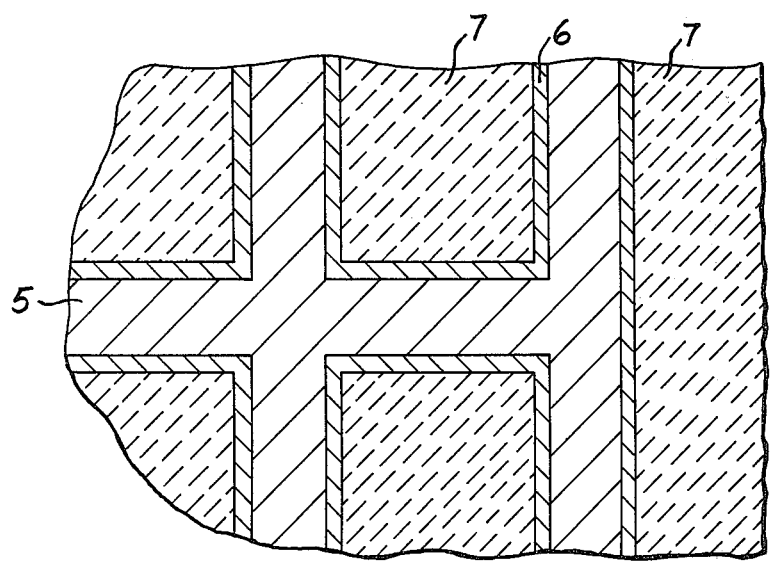
Figure 3:
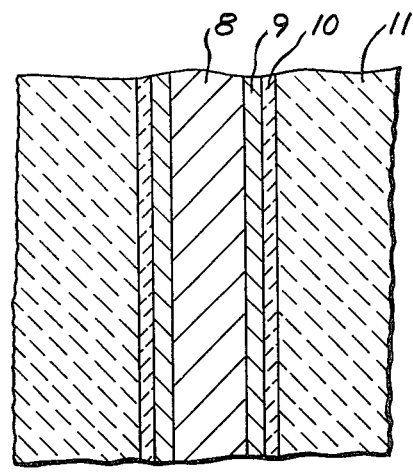
Figure 4:
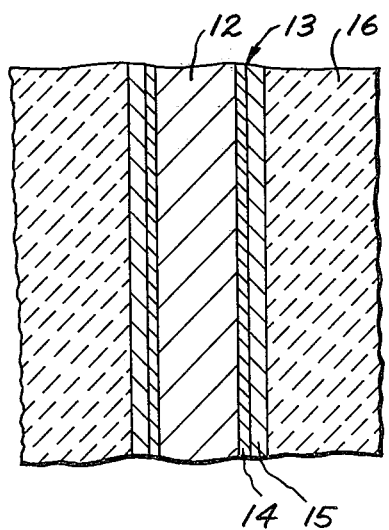
Figure 5:
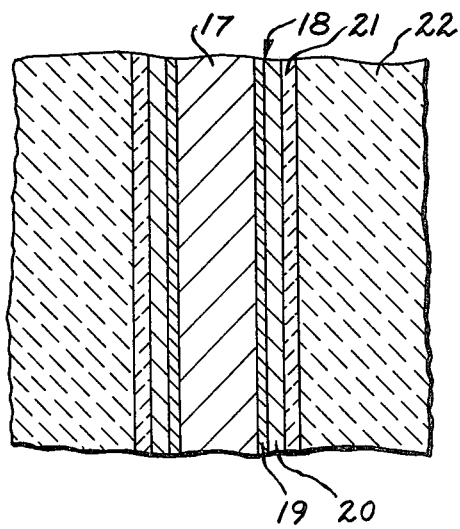

A further understanding of the present invention can be gained from the description set forth below, considered in conjunction with the Figures accompanying and forming a part of the specification, in which:

FIG. 1 is a partially broken-away view of an embodiment of the present electrode showing the present grid 3 in the form of a screen supporting a porous adherent active layer mass 2 of $PbO_2$;

FIG. 2 is an enlarged cross-section of the electrode of FIG. 1 showing electrically conducting substrate 5, a pinhole-free coating of semiconducting metal oxide 6 and an adherent active porous layer mass 7 of $PbO_2$;

FIG. 3 is an enlarged cross-section of a positive electrode of the present invention similar to FIG. 1, wherein the grid is a screen, which is comprised of electrically conducting substrate 8, a pinhole-free coating of semiconducting metal oxide 9, a thin adherent layer 10 of $PbO_2$ which is significantly non-porous and an adherent active layer of porous $PbO_2$ material 11;

FIG. 4 is an enlarged cross-section of another embodiment of the present electrode, wherein the grid is a screen, which is comprised of electrically conducting substrate 12, shield 13 composed of intermediate metal coating 14 and a coating of semiconducting metal oxide 15, and an adherent external porous layer mass 16 of $PbO_2$; and FIG. 5 is an enlarged cross-section of yet another embodiment of the present positive electrode, wherein the grid is a screen, which is comprised of an electrically conducting substrate 17, a protective shield 18 composed of intermediate metal coating 19 and coating of semiconducting metal oxide 20, a thin adherent significantly non-porous layer 21 of $PbO_2$ and an adherent external layer 22 of active porous $PbO_2$.

The electrically conducting substrate of the present invention is a metal or nonmetal which would be rendered inoperable if contacted by the sulfuric acid electrolyte at the strongly oxidizing potential of the positive electrode, i.e. it would be severely corroded or oxidized by the sulfuric acid. The substrate has an electrical conductivity at room temperature (25° C.) at least sufficiently high for suitable operation of the electrode, and generally, such conductivity ranges from at least about $10^2 \, ohm^{-1} cm^{-1}$ up to about $10^6 \, ohm^{-1} cm^{-1}$. Preferably, the substrate is selected from the group consisting of aluminum, magnesium, zinc, copper, iron, cobalt, nickel, alloys thereof, carbon, and graphite. Most preferably, because of its light-weight, high conductivity and mechanical strength, the substrate is aluminum.

The form of the present substrate can vary depending on its application. Specifically, the size of the present substrate depends largely on the storage capacity of the battery. Generally, the thickness of the substrate ranges from about 0.01 millimeter up to about 10 millimeters, but more typically, it ranges from about 0.5 millimeter to about 3 millimeters. The substrate, for example, can be in the form of a screen, a perforated foil, an expanded metal mesh, or a solid sheet. Preferably, the surface of the solid sheet is sufficiently rough or has protrusions to promote adherence of the layer of $PbO_2$. Also, the substrate should have at least sufficient mechanical strength to support the $PbO_2$ layer or layers and also sufficient electrical conductivity to conduct current from the supported active porous $PbO_2$ material to the cell terminals without resulting in voltage losses in the substrate exceeding a few percent of the cell voltage.

Preferably, the substrate is cleaned to promote adhesion of the protective shield to its surface. For example, it can be degreased by immersion in a suitable organic solvent, such as benzene or ethanol, and/or, it can be cleaned and etched by immersion in an acid such as hydrochloric acid.

The substrate is protected by an adherent at least substantially pinhole-free, and preferably, a pinhole-free shield of electrically conducting material which substantially prevents, or preferably, prevents the electrolyte from contacting it. The shield covers at least that surface area of the substrate which is subject to contact with the electrolyte of the cell or battery. The shield is comprised of a coating of a semiconducting metal oxide, or alternatively, it is comprised of a composite of at least a substantially pinhole-free external coating of semiconducting metal oxide and an at least substantially pinhole-free coating of metal intermediate to the substrate and the external coating of semiconducting oxide. The sulfuric acid electrolyte has no significant deleterious effect on the present coating of semiconducting oxide, and it forms a non-corroding oxide with the metal of the intermediate coating which is not readily soluble in the sulfuric acid. The greater the number of pinholes in the shield, the shorter is the life of the present electrode. Specifically, wherever there is a pinhole, electrolyte penetrates underneath the shield and leads to a gradual lifting off of the protective shield in a circular fashion around the pinhole.

The present coating of semiconducting oxide alone would not be useful as a shield for substrates of magnesium and aluminum since they have a strong tendency to form an insulating oxide film. However, a shield comprised of the present composite of coatings would be useful for these substrates since the oxygen of the insulating oxide film essentially dissolves into the intermediate metal coating forming a semiconducting oxide.

Under the operating conditions of the battery, the present coating of semiconducting metal oxide should not change significantly in form or composition, and it should not be significantly soluble in the sulfuric acid of the electrolyte. Specifically, the semiconducting coating should be at least substantially stable under the highly corrosive and oxidizing conditions of the positive $PbO_2$ electrode or plate, i.e. it should not be significantly deleteriously affected by the operating conditions of the battery. In addition, the semiconducting metal oxide coating should have an electrical conductivity at least sufficiently high at room temperature (25° C.) for suitable operation of the positive electrode, and generally, such conductivity ranges from at least about $10^{-5}$ ohm$^{-1}$ cm$^{-1}$ up to as high as possible, for example, $10^3$ ohm$^{-1}$ cm$^{-1}$, with the highest conductivity achievable being preferred.

The present semiconducting metal oxide coating can be composed of a doped or undoped semiconducting metal oxide, i.e., its semiconducting properties may be due, for example, to its intrinsic conductivity, or to a nonstoichiometry, or to a suitable dopant, or to a combination thereof. The semiconducting metal oxides of the highest valence states which are neither oxidizable nor readily reducible are preferred. Preferably, a suitable dopant, for example a metal oxide, is incorporated into the present semiconducting metal oxide by conventional techniques to increase its electrical conductivity. Metal ions having a valence lower than that of the metal ion component of the semiconducting oxide and anions such as fluoride ($F^-$) are useful as dopants.

Most preferably, the present semiconducting metal oxide is selected from the group consisting of $SnO_2$, $TiO_2$, $Ta_2O_5$, $Nb_2O_5$ and $WO_3$. These oxides are known to be nonstoichiometric and semiconducting, i.e. they usually contain lower oxides or a small excess of the component metal ions. Suitable doping of these semiconducting oxides often increases the magnitude of their electrical conductivity by many orders of magnitude. Antimony ions ($Sb^{+++}$) or fluoride ions ($F^-$) are especially useful dopants for $SnO_2$.

The coating of semiconducting oxide is formed on the substrate surface, or alternatively, where the shield is in the form of a composite, it is formed on the metal-coated substrate, i.e. the intermediate metal coating, by a number of conventional techniques. Preferably, an organic solution of a thermally decomposable precursor of the semiconducting oxide along with any salt of the dopant or dopants, is sprayed onto the substrate, or metal-coated substrate. Spraying can be carried out with a spray gun which produces a very fine mist at elevated temperatures, typically ranging from about 250° C. to about 600° C., in air which results in a coating of the oxide or mixtures of oxides on the substrate or metal-coated substrate.

The present coating of metal is intermediate to the substrate and the coating of semiconducting metal oxide, i.e. it is in direct contact with and adherent to the substrate as well as the coating of semiconducting metal oxide. The metal or metal alloy of the intermediate coating is one which is not significantly deleteriously affected by the sulfuric acid of the electrolyte, but on contact with such acid, forms a non-corroding oxide. Also, the metal or metal alloy of the intermediate coating has an electrical conductivity at room temperature (25° C.) at least sufficiently high for suitable operation of the electrode, and generally, such conductivity ranges from about $10^2$ ohm$^{-1}$ cm$^{-1}$ to about $10^6$ ohm$^{-1}$ cm$^{-1}$. Preferably, the metal of the intermediate coating is selected from the group consisting of titanium, tin, niobium, tantalum, tungsten, molybdenum, zirconium and alloys thereof.

This coating of metal or metal alloy on the substrate surface can be carried out by a number of conventional techniques. Depending on the nature of the metal, it can be electroplated from a nonaqueous or aqueous bath or solution, or, alternatively, it can be plated from electroless plating solutions by simple immersion of the substrate. For example, titanium and other metals of similarly high electropositivity can be plated from a nonaqueous bath. Electroplating is a preferred technique since the electroplated metal film or coating has less of a tendency of developing pinholes. Sputtering or vaporization also can be used. Deposition of the metal coating from the vapor phase is particularly useful since it can be carried out in the same apparatus used to deposit the semiconducting metal oxide.

The present protective shield covers at least that surface area of the substrate which is subject to contact with the electrolyte. The shield is at least sufficiently thick so that it is at least substantially free of pinholes. Generally, its thickness ranges from about 30 Angstroms to about 100,000 Angstroms or 0.01 millimeter. A shield without significant pinholes having a thickness smaller than 30 Angstroms is usually difficult to obtain. A shield having a thickness significantly greater than 100,000 Angstroms may not be useful since it may tend to flake off. For best results, the shield has a thickness ranging from about 1000 Angstroms to about 10,000 Angstroms.

When the shield is a composite of an intermediate coating of metal or metal alloy and an external coating of semiconducting oxide, the thickness of the metal coating generally ranges from about 30 Angstroms to about 10,000 Angstroms, and preferably, from about 500 Angstroms to about 5,000 Angstroms, and the semiconducting oxide coating generally ranges from about 30 Angstroms to about 100,000, and preferably, from about 500 Angstroms to about 5,000 Angstroms. Preferably, the semiconducting oxide coating is thicker than the metal coating to optimize pinhole freedom to insure that no significant portion of the metal coating is contacted with the sulfuric acid electrolyte. In such case, the extent of passivating oxide formation is greatly reduced and the electrical conductivity of the metal coating is not significantly impaired.

As illustrated in FIGS. 1 and 2, the present grid is provided with an external layer of chemically active material, i.e. lead peroxide ($PbO_2$), which can be applied by a number of conventional techniques. For example, a layer of an aqueous-base lead oxide paste of desired viscosity can be applied to the grid by usual pasting techniques, dried in an environment of controlled humidity, immersed in dilute sulfuric acid, electrically oxidized to convert the layer to lead peroxide and washed with water to remove excess sulfuric acid. The final thickness of the external $PbO_2$ layer can vary and depends, as does the size of the grid, on the desired storage capacity of the battery. Generally, the thickness of the external active $PbO_2$ layer ranges from about 0.01 millimeter to about 10 millimeters depending largely on the thickness and form of the grid. The active material, i.e. the external layer of $PbO_2$, has some porosity resulting in a higher surface area exposed to the sulfuric acid electrolyte which enhances good electrode performance. Generally, it has a porosity ranging from about 20% by volume to about 80% by volume and typically, from about 40% by volume to about 60% by volume. The present grid conducts current between the $PbO_2$ layer which it supports and the cell terminals which may be spot-welded or otherwise conductingly attached to the grid.

FIGS. 3 and 5 show alternative embodiments of the present invention which are particularly desirable for operation of the positive electrode in a battery intended for use at high currents or high electric power levels. Specifically, FIGS. 3 and 5 show a continuous, intermediate layer 10 and 21, respectively, of $PbO_2$ which is non-porous, or which has no significant porosity, and an external porous layer 11 and 22, respectively, of $PbO_2$. Intermediate $PbO_2$ layers 10 and 21 are significantly more dense than the external active layers and reduce voltage losses significantly, i.e. the voltages at charge and discharge are improved significantly. Intermediate $PbO_2$ layers 10 and 21 are applied in a conventional manner, for example, by electrodeposition, by making the present grid the positive electrode in a cell containing a divalent lead salt such as lead oxide (PbO) dissolved in 30% by weight perchloric acid and electrodepositing the $PbO_2$ layer thereon at a rate typically about 50,000 Angstroms per hour. Intermediate $PbO_2$ layer 10 or 21 need only have a thickness which makes it continuous, and typically, its density is about 90% of theoretical, and generally, its thickness ranges from about 1,000 Angstroms to about 200,000 Angstroms or 0.02 millimeter. The porosity of the active $PbO_2$ layer 11 or 22 is at least significant and depends largely on the application of the electrode. Generally, its porosity ranges from about 20% by volume to about 80% by volume, and typically its porosity ranges from about 40% by volume to about 60% by volume. High porosity is desirable for high current levels. Generally, $PbO_2$ layer 11 or 22 ranges in thickness from about 0.01 millimeter to about 10 millimeters, and its particular thickness depends largely on the thickness and form of the grid.

The invention is further illustrated by the following examples:

EXAMPLE 1

A substrate comprised of an Al-foil of 0.25 mm thickness was used. The foil was cleaned by immersion in a standard organic degreasing bath, washed with water and dried in air.

The electrochemical behavior of the cleaned substrate was then examined under conditions similar to those encountered by a grid in a positive $PbO_2$ electrode in a lead-sulfuric acid electrolyte cell or battery. The substrate was mounted in a glass cell, filled with sulfuric acid electrolyte of s.g. 1.28 g/cm$^3$, which also contained a negative Pb electrode. The substrate was kept at a voltage of 2.1 volts positive with respect to the Pb electrode and the current was monitored as a function of time.

Within a time period of 2 hours, the current density increased from an initial value of 0.002 mA/cm$^2$ to a value of 0.05 mA/cm$^2$ and continued rising thereafter. Microscopic examination revealed severe corrosion of the Al substrate. This example demonstrates that unprotected Al is unsuitable for use as a grid in a positive $PbO_2$ electrode in Pb-sulfuric acid electrolyte cells or batteries.

EXAMPLE 2

A grid was prepared comprised of a substrate composed of a silicon wafer of 0.25 mm thickness coated with a layer of aluminum 10,000 Angstroms thick, and a shield produced by a composite of an external coating of semiconducting $SnO_2$ 1500 Angstroms thick and a coating of titanium 500 Angstroms thick intermediate to the aluminum and $SnO_2$ coatings.

The wafer of silicon was thoroughly cleaned by a standard technique in the integrated circuit art. Standard beam sputtering techniques were used to deposit the aluminum coating on the cleaned silicon wafer and to deposit the titanium coating. The $SnO_2$ layer was doped with Sb to raise its conductivity and was prepared by standard chemical vapor deposition techniques. Specifically, a mixture of gases consisting of $N_2$, $O_2$, $(CH_3)_4Sn$ and $(CH_3)_3Sb$ was passed over the coated Si wafer for 5 minutes in an oven heated to 480° C. The substrate was then cooled to room temperature in a $N_2$ atmosphere.

All of the deposited coatings were substantially non-porous.

The electrochemical behaviour of this grid was examined in the same cell and under the same conditions as disclosed for the substrate of Example 1.

In contrast to the observations on the substrate in Example 1, the current density on the grid decreased within a time period of ten days from an initial value of 0.01 mA/cm$^2$ to a very low value of 0.0004 mA/cm$^2$. Microscopic examination revealed that the grid had essentially remained unchanged during this 10-day test and that essentially no corrosion had taken place. Small amounts of $O_2$ bubbles formed on the grid during this experiment and account for the small currents flowing through the cell.

This example demonstrates that a shield comprising a substantially non-porous $SnO_2$ layer and a substantially nonporous Ti layer protect the Al from corrosion.

EXAMPLE 3

The substrate, an expanded aluminum screen of 0.25 mm thickness and dimensions of 5 cm×4 cm, was cleaned by immersion in a standard organic degreasing bath and washed in distilled water followed by removing the oxide film in concentrated NaOH solution.

The cleaned screen was coated with a 500 Angstrom thick titanium layer which was substantially free of pinholes by a standard beam sputtering technique.

The coated screen was then placed in an air oven at 400° to 600° C., supported by a plate made of glass or ceramic and sprayed with a spray gun for about 5 to 10 seconds with a fine mist consisting of a solution of 200 g. of $SnCl_4$ and 100 g. of $NH_4F$ in 1000 cc of methyl alcohol. The spraying was interrupted sufficiently long for the temperature to recover to between 400° and 600° C., usually for about 1 minute, and then resumed again for 5 to 10 seconds followed by a 1 minute wait. The coated screen was sprayed in this manner 10 to 20 times to build up a continuous adherent coating of fluoride-doped $SnO_2$ having a thickness of about 3000 Angstroms. All of the surface area of the substrate was covered with this $SnO_2$ coating which was substantially free of pinholes.

A paste of active material, composed of 4.5 grams lead oxide (PbO), 0.4 cc concentrated $H_2SO_4$ acid and about 0.3 cc water, was applied to the resulting grid to completely cover the grid. The pasted grid was dried in air with approximately 50% relative humidity at room temperature, and the weight of the dried PbO paste was 3.8 grams, which results in a theoretical capacity of 0.9 ampere hours. The dried pasted electrode was freely suspended without the use of separators, in a glass cell containing sulfuric acid with s.g. 1.08 g/cm$^3$ and a negative lead electrode. It was charged with 45 milliamperes for 20 hours. This converted the PbO paste to active, porous $PbO_2$, thereby producing the present positive electrode.

This electrode would be useful as a positive electrode in a secondary lead-sulfuric acid electrolyte cell or battery.

EXAMPLE 4

The substrate was an Al-foil of 0.25 mm thickness. The foil was cleaned in the same manner as disclosed in Example 3.

A fluoride doped $SnO_2$ coating about 3000 Angstroms thick was deposited on the Al foil in the same manner disclosed in Example 3. All of the surface area of the substrate was covered with this coating which was significantly free of pinholes.

Electrical resistance measurements showed the existence of a highly resistive film between the Al foil and the $SnO_2$ coating. Resistance values between 25 and 50 ohms square were found. Such a substrate is unsuitable for use as a grid in a positive $PbO_2$ electrode. By comparison, the grid of Example 2 had a resistance of only 0.03 ohm square, showing the absence of a highly resistive film between Al and Ti or between Ti and $SnO_2$.

This example demonstrates the need for a substantially non-porous intermediate metal layer, such as Ti, between the Al and the semiconducting $SnO_2$ layer.

Ser. No. 228,648 filed of even date herewith in the name of Fritz Gustav Will entitled POSITIVE ELECTRODE FOR LEAD ACID BATTERY and assigned to the assignee hereof is incorporated herein by reference and discloses a positive electrode for use in a lead-sulfuric acid electrolyte battery comprised of a grid supporting an adherent layer of $PbO_2$, said grid being comprised of an electrically conducting metal substrate having an adherent substantially pinhole-free coating of semiconducting metal oxide, the sulfuric acid electrolyte having no significant deleterious effect on the coating and forming a non-corroding oxide with the metal substrate.

What is claimed is:

1. A positive electrode for use in a secondary lead-sulfuric acid electrolyte cell or battery comprised of a grid supporting an adherent external layer of $PbO_2$, said grid being comprised of an electrically conducting substrate having an adherent protective at least substantially pinhole-free shield of electrically conducting material, said shield being composed of a coating of semiconducting metal oxide, or a composite of at least a substantially pinhole-free external coating of semiconducting metal oxide and at least a substantially pinhole-free coating of metal intermediate to the substrate and semiconducting oxide coating, said sulfuric acid electrolyte having a substantially deleterious effect on said substrate, but having no significant deleterious effect on said shield.

2. The positive electrode according to claim 1 wherein said substrate is selected from the group consisting of aluminum, magnesium, zinc, copper, iron, cobalt, nickel, alloys thereof, carbon and graphite.

3. The positive electrode according to claim 1 wherein said semiconducting metal oxide is selected from the group consisting of $SnO_2$, $Nb_2O_5$, $TiO_2$, $Ta_2O_5$, and $WO_3$.

4. The positive electrode according to claim 1 wherein said intermediate coating of metal is selected from the group consisting of tin, niobium, titanium, tantalum, tungsten, molybdenum, zirconium and alloys thereof.

5. The positive electrode according to claim 1 wherein said substrate and said intermediate coating of metal have an electrical conductivity at room temperature ranging from about $10^2$ ohm$^{-1}$ cm$^{-1}$ up to about $10^6$ ohm$^{-1}$ cm$^{-1}$, and said semiconducting metal oxide has an electrical conductivity at room temperature of at least about $10^{-5}$ ohm$^{-1}$ cm$^{-1}$.

6. The positive electrode according to claim 1 wherein said substrate has a thickness ranging from about 0.01 millimeter up to about 10 millimeters.

7. The positive electrode according to claim 1 wherein said substrate has a thickness ranging from about 0.01 millimeter up to about 10 millimeters.

8. The positive electrode according to claim 1 wherein said external layer of $PbO_2$ is at least significantly porous and wherein there is a layer of $PbO_2$ intermediate to said shield and said external layer of $PbO_2$, said intermediate layer of $PbO_2$ being at least significantly non-porous.

9. A porous electrode for use in a secondary lead-sulfuric acid electrolyte cell or battery comprised of a grid supporting an adherent external layer of $PbO_2$, said grid being comprised of an aluminum substrate having an adherent electrically conducting shield in the form of a composite, said composite being comprised of an external at least substantially pinhole-free coating of semiconducting stannic oxide and at least a substantially pinhole-free coating of titanium intermediate to said substrate and said external coating of stannic oxide.

10. The positive electrode according to claim 9 wherein said external layer of $PbO_2$ is at least significantly porous and wherein there is a layer of $PbO_2$ intermediate to said shield and said external layer of $PbO_2$, said intermediate layer of $PbO_2$ being at least significantly non-porous.

* * * * *